United States Patent [19]

Koyama et al.

[11] Patent Number: 4,690,754
[45] Date of Patent: Sep. 1, 1987

[54] FILTER DEVICE FOR A MINUTE VOLUME OF LIQUID

[75] Inventors: Kenji Koyama; Shotaro Ohno, both of Yamaguchi, Japan

[73] Assignee: Toyo Soda Manufacturing Co., Ltd., Shinnanyo, Japan

[21] Appl. No.: 837,836

[22] Filed: Mar. 10, 1986

[30] Foreign Application Priority Data

Mar. 12, 1985 [JP] Japan .................................. 60-47533

[51] Int. Cl.$^4$ ............................................ B01D 13/01
[52] U.S. Cl. .................................. 210/94; 210/321.1; 210/433.2; 210/500.23
[58] Field of Search ............. 210/321.1, 433.2, 500.23, 210/94, 323.2, 416.1, 512.1

[56] References Cited

U.S. PATENT DOCUMENTS 4,242,203 12/1980 Amicel et al. ..................... 210/321.1
4,267,053 5/1981 Hashino et al. .................. 210/321.1

Primary Examiner—Ivars Cintins
Attorney, Agent, or Firm—Oblon, Fisher, Spivak, McClelland & Maier

[57] ABSTRACT

A filter device for a minute volume of liquid, usable under a centrifugal force or under pressure, comprising a cylindrical member and a hollow thread filter having an open lower end and housed in said cylindrical member to form an annular space for containing a sample liquid around the filter, with the lower part of the hollow thread filter liquid-tightly bonded to the inside wall of the lower part of the cylindrical member and with the upper end of the hollow thread filter sealed.

6 Claims, 6 Drawing Figures

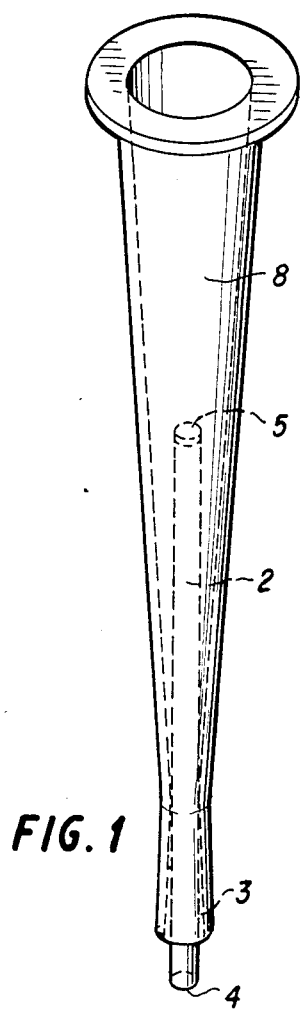
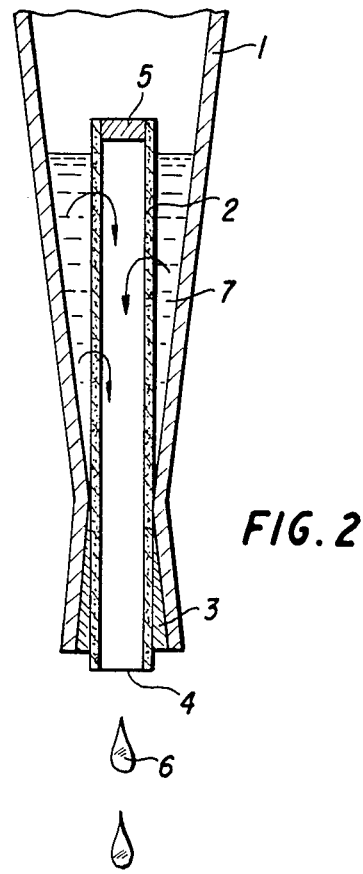
FIG. 1
FIG. 2

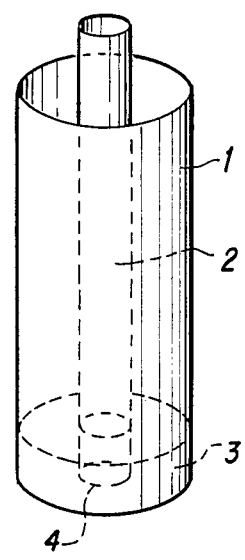 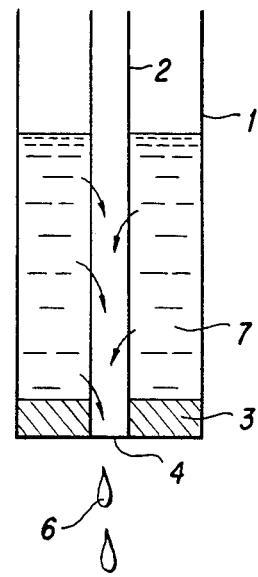
FIG. 4A
FIG. 4B

FILTER DEVICE FOR A MINUTE VOLUME OF LIQUID

BACKGROUND OF THE INVENTION

1. Field of the Invention

The present invention relates to a filter for filtering a minute volume of liquid which is operated under centrifugal force or under pressure. Filters according to the present invention are useful as filters for use in various pretreatments in clinical or chemical analyses.

2. Description of Prior Arts

In clinical analyses, a filter disk of a diameter of about 1 cm which is fixed at the bottom end of a cylindrical member has been preferentially employed for removal and concentration of protein in blood serum or plasma. However, this conventional type of a filter device requires a relatively large volume, say more than 0.5 ml of a sample liquid, while, for example, the volume of blood can be sampled from a mouse is limited to about 0.1 ml, therefore, the conventional filter device cannot successfully meet with such cases. Thus, the amount of samples to be subjected to pretreatments have been decided by the size of a semipermeable membrane attached to the bottom end of the cylindrical member. When a very small volume, say several ten microliters, of a sample is pretreated in this mode of filtration, the filter membrane must be placed at the bottom end of a very fine cylindrical member. Consequently, the effective area of filtration is necessarily reduced, hence a longer time is required by the filtration.

A hollow fiber filter for a minute volume of liquid has succeeded in overcoming the above difficulties. In this filter, a large effective area of filtration is secured in a small housing by using a hollow fiber and the filtration is performed under centrifugation. This type of filter has been proved to be advantageous in rapid filtration of a liquid sample of a minute volume, but has been still confronted with a problem that this filter cannot be applied to filtration under pressure.

SUMMARY OF THE INVENTION

The object of the present invention is to provide a filter device for a minute volume of liquid which is capable of filtering as small a volume of a sample liquid as less than 100 μl (0.1 ml) and is successfully operative under both a centrifugal driving mode and a pressure driving mode.

The filter for a minute volume of liquid, under a centrifugal force or under pressure according to the present invention comprises a cylindrical member and a hollow fiber filter, having an open lower end and housed in said cylindrical member to form an annular space for containing a sample liquid around the filter, with the lower part of the hollow fiber filter liquid-tightly bonded to the inside wall of the lower part of the cylindrical member and with the upper end of the hollow fiber filter sealed.

The present invention will be better understood from the following description of preferred embodiments with reference to the attached drawings.

BRIEF EXPLANATION OF THE DRAWINGS

FIG. 1 is a schematic view showing an example of the filter according to the present invention.

FIGS. 2 and 3 are respectively a cross-sectional view of the filter shown in FIG. 1 under service.

FIGS. 4(a) and (b) show a modification of the filter device according to the present invention.

DETAILED DESCRIPTION OF THE INVENTION

Figure 3:
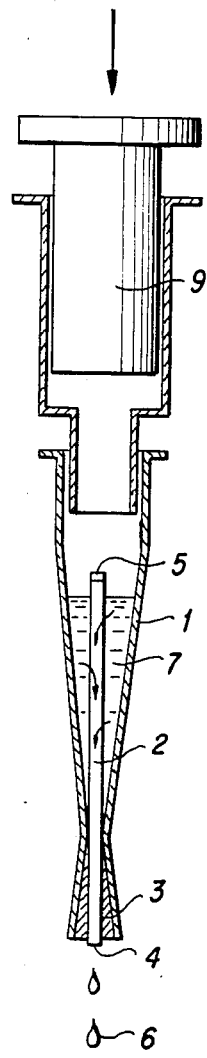

In FIG. 1 which is a schematic view showing an example of the present invention, the filter device comprises a cylindrical member 1 which forms a housing and a hollow fiber filter 2 housed in the cylindrical member 1, are fixed together tightly at the junction 3 at the lower end of the cylindrical member 1. The open lower end of the hollow fiber filter 2 constitutes an opening 4 of the filter device. The upper end of the hollow fiber filter is sealed with a sealer 5 to prevent the liquid contained in the housing from directly coming into the hollow fiber filter through the upper end when a minute volume of liquid is poured into the housing. Preferably the upper part 8 of the cylindrical member 1 is tapered so as to constrict the annular space between the cylindrical member 1 and the filter toward the lower portion, and to tightly accomodate a nozzle of an injector syringe which is used to apply pressure in the housing. It is not essential that the cylindrical member is tapered, but it may be of a stepped shape as shown in FIG. 4.

The cylindrical member 1 may be composed of any material inasmuch as it does not react chemically with liquids to be filtered. The material may be selected, for example, from glass, synthetic resins and stainless steel. For the purpose of easy inspection into the inside through the housing, a transparent or semitransparent material such as glass and synthetic resins are preferred.

The maximum inner diameter of the cylindrical member 1 with section of the largest diameter is preferably 1.5 to 3 times as large as the outer diameter of the hollow fiber filter. Otherwise, if the inner diameter of the cylindrical member 1 is much large relatively to the outer diameter of the hollow fiber filter, a liquid to be treated may be filtered at the lower part of the filter without effectively covering the full area of the filter. In addition, the cylindrical member 1 is preferably 5 to 10 cm long.

The dimensions of the hollow fiber filter 2 to be housed in the cylindrical member 1 may be selected arbitrarily in accordance with the outer diameter and samples to be treated. Considering the volume of cylindrical member 1, sample size, filtration speed, and easiness of preparation, it is preferred to adjust the outer diameter of the filter within the range of from 1 to 2 mm. Further, the filtration speed is influenced by the thickness of the membrane; a higher speed of filtration is given with a thinner membrane. But the strength is reduced with a thin membrane. Thus, the inner diameter is preferably 60 to 80% of the outer diameter. It is preferable that the hollow fiber filter 2 is housed in the cylindrical member 1 coaxially with the central axis of the cylindrical member 1 but this is not essential.

Fixing of the cylindrical member 1 to the hollow fiber filter 2 is made, after the latter has been inserted in the former, with an ordinary adhesive material. When the cylindrical member 1 has a closed bottom, the bottom is bored concentrically with the central axis, and the hollow fiber filter is inserted in the bored hole and fixed with an ordinary adhesive material. There may be different ways to construct the device so far as the desired result is obtained.

Adhesive material may be selected arbitrarily on the condition that the adhesive material is of a rapid hardening nature and does not react with the sample liquids. Thermosetting resins such as epoxy and urethane resins and the vinyl chloride adhesives in paste are recommended.

Closing of the upper end of the hollow fiber filter 2 can be performed with an adhesive material which does not react with the sample liquids or by other means such as ultrasonic or high frequency adhesion that assures complete closure.

The length of the hollow fiber filter 2 in the cylindrical member 1 should be shorter than the full length of the cylindrical member, and short enough not to touch the nozzle of injector when a pressure is applied.

The hollow fiber filters 2 to be employed in this invention include microfilters having micro-scale pores observable only with an electron microscope and ultrafiltration membranes which retain protein and other high molecular substances. They are selected according to the substances to be filtered.

The hollow fiber filter to be used in the present invention is preferably selected from ultrafiltration membranes for removal and concentration of protein which are permeable with molecules having the molecular weight from $1 \times 10^3$ to $1 \times 10^5$.

The hollow fiber filters 2 are mostly composed of cellulose series materials such as regenerated cellulose, cellulose acetate and cellulose nitrate; and synthetic high molecular materials including polyvinyl chloride, copolymer of acrylonitrile with vinyl chloride, polyacrylonitrile, polyethylene and polyproplyene.

The following description is made as to how the filter device for a minute volume of liquid of the present invention is used.

FIG. 2 is a cross-sectional view of the filter device of this invention when a centrifugal force is applied as the driving force for filtration. As shown in FIG. 2, a sample liquid 7 is placed in the cylindrical member 1 and the whole is shaken in a centrifugal separator, to obtain a filtrate 6. The magnitude of gravity to be applied in this operation is preferably 300 to 2000 g (g is acceleration by gravity: the same applys hereinafter.) On continuing the centrifugation, the sample liquid 7 gradually passes through the membrane of the hollow fiber filter 2, gathers at the central cavity of the filter 2, and then the liquid is transferred through the opening 4 and collected as filtrate 6.

FIG. 3 shows how to apply pressure to the sample liquid 7 in the cylindrical member 1 by means of an injector syringe, to obtain the filtrate 6.

The filter device for a minute volume of liquid of the present invention which employs a hollow fiber filter enables filtration of a minute volume of liquid samples to be effectively performed under a centrifugal force or under pressure applied as driving force of filtration. In particular, since the filter wall lies in a slant or parallel direction to that of the centrifugal force, solid materials hindered at the filter wall are forced to move along the surface of the hollow fiber filter without blocking the filter pores even when either an angle- or swing-type centrifugal separator is employed.

The present invention will be better understood from the following description of a preferred embodiment.

DESCRIPTION OF THE PREFERRED EMBODIMENT

The cylindrical member 1 was prepared with a 80 mm long tapered pipe of acrylic resin whose tapered upper part was 40 mm in the inner diameter and 1.5 mm at the lower juntion. The hollow fiber filter 2 composed of a polyvinyl chloride ultrafiltration membrane (allowing to partition a molecular weight of $3 \times 10^4$) was 45 mm long, 1.5 mm and 1.0 mm in the outer and inner diameter, respectively. The upper end was closed with high frequency fusing and the junction with the cylindrical member 1 was fixed with an epoxy resin. Thus, a filter device for a minute volume of liquid has been completed.

Application 1

Into the filter device for a minute volume of liquid prepared in Example, 100 μl (0.1 ml) of bovine serum was placed in the cylindrical member 1 by means of an injector syringe, and followed by centrifugation with a swing-type centrifugal separator for 15 minutes. The gravity was about 1,000 g.

When the centrifugal separator stopped, a filtrate of about 70 μl volume was obtained on an accepting dish.

Application 2

Into the filter device for a minute volume of liquid prepared in Example 1, 100 μl (0.1 ml) of bovine serum was placed in the cylindrical member 1 by means of an injector syringe. Then a large injector syringe containing air in it was fitted to the tapered part 8 and a pressure was given to the whole content.

The pressed condition continued for 3 minutes, and 30 μl of a filtrate was obtained on an accepting dish.

COMPARISON EXAMPLE

Figure 5:
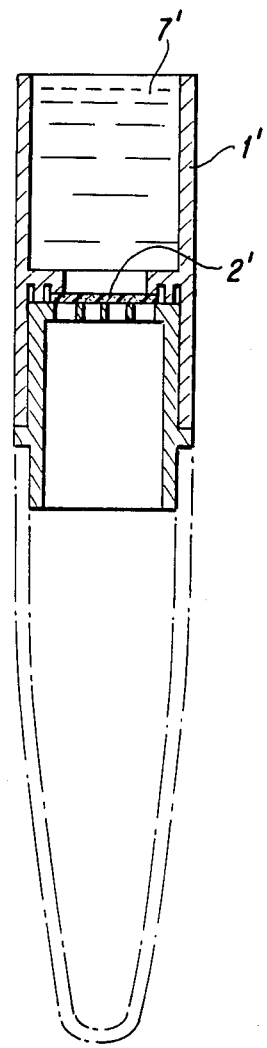
FIG. 5 shows a part of the filter device used in the comparison example.

Into a cylindrical dispo-filter member 1' in which a flat ultrafiltration membrane 2' made of cellulose of a diameter 1.0 cm was placed as shown in FIG. 5, 100 μl of bovine serum 7' was introduced. The whole content was pressed by a pressure from an injector syringe under the same condition as in Application 2. After an hour pressing applied, only 10 μl of a filtrate was obtained.

We claim:

1. A filter device for a minute volume of liquid in combination with means for applying pressure or centrifugal force, said filter device comprising a cylindrical member and a single hollow fiber filter having an open lower end and housed in said cylindrical member to form an annular space for containing a sample liquid around the filter, with the lower part of the hollow fiber filter liquid-tightly bonded to the inside wall of the lower part of the cylindrical member and with the upper end of the hollow fiber filter sealed, said hollow fiber filter being a microfilter having micro-scale pores observable only with an electron microscope or an ultrafiltration membrane.

2. A filter device according to claim 1, wherein the hollow fiber filter is composed of an ultrafiltration membrane.

3. A filter device according to claim 1, in which the cylindrical member is tapered to be narrowed at least at the lower portion so as to be in the shape of a truncated cone.

4. A filter device according to claim 1, in which the hollow fiber filter is made of transparent or semi-transparent material non-reactive to a liquid sample to be filtered.

5. A filter device according to claim 1, in which the cylindrical member has an inner diameter 1.5 to 3 times larger than the largest outer diameter of the filter.

6. A filter device according to claim 1, in which the filter has an inner diameter of 60 to 80% of its outer diameter.

* * * * *